United States Patent
Wong et al.

(10) Patent No.: US 9,945,676 B2
(45) Date of Patent: Apr. 17, 2018

(54) NAVIGATION SYSTEM WITH CONTENT CURATION MECHANISM AND METHOD OF OPERATION THEREOF

(71) Applicant: TeleNav, Inc., Sunnyvale, CA (US)

(72) Inventors: Jaffe Wong, San Jose, CA (US); Aliasgar Mumtaz Husain, Milpitas, CA (US); Sunny Dinmohamed Panjwani, Snata Clara, CA (US)

(73) Assignee: Telenav, Inc., Santa Clara, CA (US)

( * ) Notice: Subject to any disclaimer, the term of this patent is extended or adjusted under 35 U.S.C. 154(b) by 636 days.

(21) Appl. No.: 13/785,685

(22) Filed: Mar. 5, 2013

(65) Prior Publication Data

US 2014/0258293 A1 Sep. 11, 2014

(51) Int. Cl.
G06F 17/30 (2006.01)
G01C 21/26 (2006.01)
G01C 21/36 (2006.01)

(52) U.S. Cl.
CPC ......... *G01C 21/26* (2013.01); *G01C 21/3679* (2013.01); *G06F 17/30598* (2013.01)

(58) Field of Classification Search
CPC .............. G01C 21/3679; G06F 17/30598
See application file for complete search history.

(56) References Cited

U.S. PATENT DOCUMENTS

| | | | |
|---|---|---|---|
| 7,062,509 B1 * | 6/2006 | Nenov et al. | |
| 7,353,109 B2 | 4/2008 | Han | |
| 8,676,804 B1 * | 3/2014 | Janos et al. | 707/737 |
| 8,706,732 B1 * | 4/2014 | Janos et al. | 707/737 |
| 9,002,848 B1 * | 4/2015 | Peng | G06F 17/30705 |
| | | | 707/737 |
| 9,047,384 B1 * | 6/2015 | Barbeau | G07C 1/10 |
| 2007/0268310 A1 * | 11/2007 | Dolph et al. | 345/629 |
| 2007/0281690 A1 * | 12/2007 | Altman et al. | 455/435.1 |
| 2009/0110302 A1 * | 4/2009 | Snow | 382/225 |
| 2009/0287546 A1 * | 11/2009 | Gillespie et al. | 705/10 |
| 2010/0023259 A1 * | 1/2010 | Krumm et al. | 701/208 |
| 2010/0094910 A1 | 4/2010 | Bayliss | |
| 2010/0332524 A1 | 12/2010 | Uchida et al. | |
| 2011/0010364 A1 | 1/2011 | Ahtisaari et al. | |
| 2011/0010650 A1 * | 1/2011 | Hess et al. | 715/765 |
| 2011/0201317 A1 | 8/2011 | Karandikar et al. | |
| 2012/0022782 A1 * | 1/2012 | Laube et al. | 701/410 |
| 2012/0232788 A1 * | 9/2012 | Diao | 701/426 |
| 2012/0254263 A1 * | 10/2012 | Hiestermann et al. | 707/812 |
| 2013/0103293 A1 * | 4/2013 | Ma et al. | 701/118 |
| 2013/0232006 A1 * | 9/2013 | Holcomb | G06F 17/30864 |
| | | | 705/14.54 |

(Continued)

OTHER PUBLICATIONS

Article entitled "Detecting Nearly Duplicated Records in Location Datasets", by Zheng et al., dated Nov. 2010.*

(Continued)

*Primary Examiner* — Mahesh Dwivedi
(74) *Attorney, Agent, or Firm* — Perspectives Law Group

(57) ABSTRACT

A method of operation of a navigation system includes: determining a similarity level based on comparing a plurality of a point of interest (POI) record; generating a record cluster based on the similarity level for grouping the plurality of the POI record; and generating an exemplary POI based on the record cluster for displaying on a device.

20 Claims, 5 Drawing Sheets

(56) References Cited

U.S. PATENT DOCUMENTS

2013/0325329 A1* 12/2013 Gupta et al. ................. 701/450
2015/0066649 A1*  3/2015 Kumar et al. ............. 705/14.64

OTHER PUBLICATIONS

Article entitled "Collaborative Semantic Points of Interests", by Braun et al., dated 2010.*
Article entitled "Context-aware Collaborative Creation of Semantic Points of Interest as Linked Data", by Braun, dated Sep. 21, 2009.*
Article entitled "Automatic Classification of Location Contexts with Decision Trees", by Santos et al., dated Jun. 30, 2006.*
Article entitled "Automatic Classification of Points-of-Interest for Land-use Analysis", by Rodrigues et al., Copyright 2012.*
Article entitled "Probabilistic Name and Address Cleaning and Standardisation", by Christen et al., Copyright 2002.*
Hein et al., "Similarity Graphs in Machine Learning—Practical Session on Graph Based Algorithms for Machine Learning", Aug. 2007, pp. 1-23.
Cohen et al., "A Comparison of String Distance Metrics for Name-Matching Tasks", 2003, pp. 1-6, Publisher: American Association for Artificial Intelligence.

* cited by examiner

NAVIGATION SYSTEM WITH CONTENT CURATION MECHANISM AND METHOD OF OPERATION THEREOF

CROSS-REFERENCE TO RELATED APPLICATION(S)

The present application contains subject matter related to a concurrently filed U.S. Patent Application by Jaffe Wong et al. entitled "NAVIGATION SYSTEM WITH CONTENT CURATION MECHANISM AND METHOD OF OPERATION THEREOF." The related pending application is assigned to TeleNav, Inc. and is identified by application Ser. No. 13/785,735. The subject matter thereof is incorporated herein by reference thereto.

TECHNICAL FIELD

The present invention relates generally to a navigation system, and more particularly to a system with deduper mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without deduper mechanism has become a paramount concern for the consumer. The inability decreases the benefit of using the tool.

Thus, a need still remains for a navigation system with deduper mechanism. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a similarity level based on comparing a plurality of a point of interest (POI) record; generating a record cluster based on the similarity level for grouping the plurality of the POI record; and generating an exemplary POI based on the record cluster for displaying on a device.

The present invention provides a navigation system, including: a similarity module for determining a similarity level based on comparing a plurality of a point of interest POI record; a clustering module, coupled to the similarity module, for generating a record cluster based on the similarity level for grouping the plurality of the POI record; and a synthesis module, coupled to the clustering module, for generating an exemplary POI based on the record cluster for displaying on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
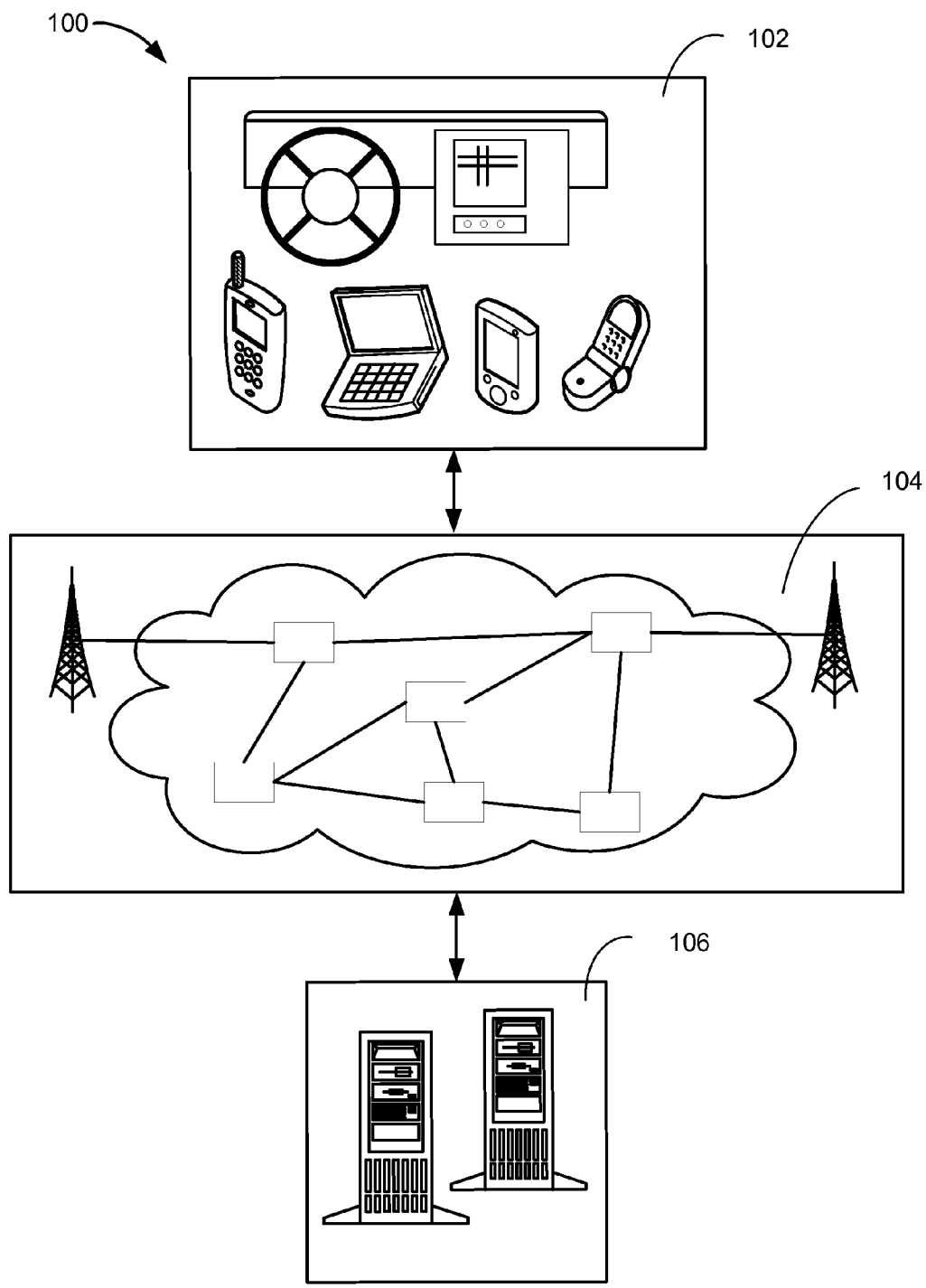
FIG. 1 is a navigation system with deduper mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with deduper mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
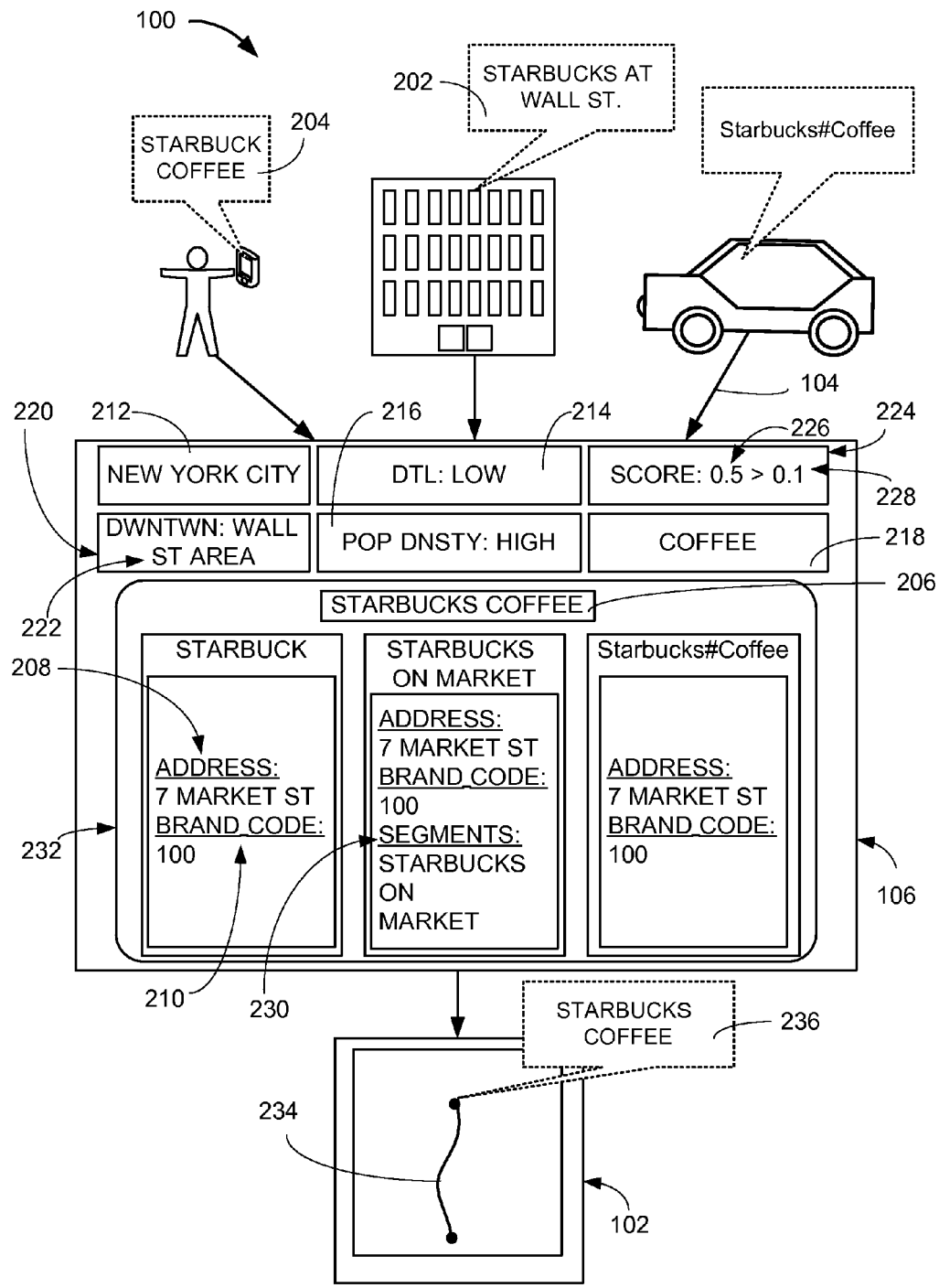
FIG. 2 is an example of the navigation system receiving a point of interest (POI) record from a record source.

Referring now to FIG. 2, therein is shown an example of the navigation system 100 receiving a point of interest (POI) record 202 from a record source 204. For clarity and brevity, the discussion of the present invention will focus on the first device 102 displaying the result generated by the navigation system 100. However, the second device 106 and the first device 102 can be discussed interchangeably.

The navigation system 100 can receive the POI record 202 from a plurality of the record source 204. For example, the record source 204 can include POI information provided by a vendor, such as Yelp™, an American city guide website.

The POI record 202 can represent the POI information. For example, the POI record 202 can include a record attribute 208, such as a name of a POI 206, address information of the POI 206, contact information of the POI 206, or a combination thereof. For example, the POI record 202 can include the POI information provided to the navigation system 100 to apply data deduplication to eliminate unrefined or redundant POI information. For another example, the POI record 202 can include POI information that is incomplete or irrelevant for generating an exemplary POI 236. Details regarding the exemplary POI 236 will be discussed later.

For different example, the record attribute 208 can represent a brand code 210, which can be represented as a numeric code to specify a particular brand, industry, or a combination thereof. For example, Starbucks Coffee™, an American coffee shop, can have the brand code 210 of "100." The brand code 210 "100" can represent, for example, a "Retail Eating & Drinking Place" as designated by an industry standard, such as the Standard Industrial Classification ("SIC").

The user of the first device 102 can enter "Starbuck Coffee" into the first device 102 to locate Starbucks Coffee™ near a user's geographic vicinity. The entry of "Starbuck Coffee" can be incomplete POI information, because "Starbuck" is misspelled. The navigation system 100 can receive a user's entry of "Starbuck Coffee" as the POI record 202.

For different example, an instance of the POI record 202 can represent "Starbucks on Market St." "Starbucks on Market St." can include the POI information that is more than just the name information of the coffee shop but a portion of the address information for the POI 206. The navigation system 100 can receive a vendor's entry of "Starbucks on Market St" as the POI record 202.

For different example, the instance of the POI record 202 can represent "Starbucks#Coffee" with a non-alphabetical character, such as "#," to be included in the POI record 202. The navigation system 100 can receive the user's entry of "Starbucks#Coffee" as the POI record 202.

The exemplary POI 236 is defined as a representative instance of the POI 206. For example, if the instance of the POI record 202 is "Starbuck Coffee," the navigation system 100 can reconcile the POI record 202 to generate an instance of the exemplary POI 236 of "Starbucks Coffee™" with the correct spelling. For different example, the navigation system 100 can reconcile the instance of the POI record 202 of "Starbucks#Coffee" to generate the exemplary POI 236 of "Starbucks Coffee™." The exemplary POI 236 can represent the accurate representation of the POI information generated by the navigation system 100 to be displayed on the first device 102.

The geographic region 212 can include a neighborhood, a city, a territory, or a combination thereof. For example, the New York City (NYC) can represent the geographic region 212 within the state of New York.

The navigation system 100 can reconcile a plurality of the POI record 202 based on various factors for generating the exemplary POI 236. For generating the exemplary POI 236, the navigation system 100 can consider a distance tolerance level 214 to determine whether the plurality of the POI information is a duplicate or not. For example, the POI record 202 can include the distance tolerance level 214 as one of the record attribute 208. For specific example, the distance tolerance level 214 can be based on a population density 216, a POI type 218, or a combination thereof. Details regarding the distance tolerance level 214 will be discussed later.

Whether the population density 216 can be high or low can be determined in comparison to a global average of 46 persons per square kilometer. The population density 216 of NYC can be considered high as the population of people per unit area is 10,630 people in a square kilometer. In contrast, the population density 216 of Omaha, Nebr. can be low with the population density 216 of 1301 people in a square kilometer. The population density 216 can be high if the population density 216 can be greater than 100 times the global average. The population density 216 can be low if the population density 216 can be less than 100 times the global average.

The POI type 218 can include a category of the POI 206. For example, the POI 206 representing Starbucks Coffee™ can be represented with the POI type 218 of a coffee shop. For another example, Walmart™ can be represented with the POI type 218 of an American retail store. The POI record 202 can include the POI type 218 as one of the record attribute 208.

The distance tolerance level 214 can be represented as high, medium, or low. For example, the population density 216 in the geographic region 212 that is rural can be low. In the geographic region 212 that is rural, a physical distance between the POI 206 and another of the POI 206 with the same of the POI type 218 can be large. More specifically, a branch of Walmart™ in Nebraska can be over 50 kilometers away from another branch of Walmart™ in Nebraska. More specifically, the plurality of the POI 206 could be considered duplicates even if the physical distance between the plurality of the POI 206 is relatively large.

For example, the navigation system 100 can receive two instances of the POI record 202 with address information that is only 10 kilometers apart. Walmart™ may not exist only 10 kilometers apart in Nebraska. Subsequently, the navigation system 100 can consider the two instances of the POI record 202 as duplicate POI information that refers to the same of the POI 206. As a result, the navigation system 100 can determine the distance tolerance level 214 of Walmart™ in Omaha to be high.

In contrast, Starbucks Coffee™ in NYC, the geographic region 212 that is urban, can have the distance tolerance level 214 of low. Since the population density 216 is high in NYC and the POI 206 with the POI type 218 of coffee is abundant in NYC, even with the physical distance that is small, the plurality of the POI information can be considered not duplicates. As a result, the navigation system 100 can determine the distance tolerance level 214 of Starbucks Coffee™ in NYC to be low.

The navigation system 100 can group the plurality of the POI record 202 by generating a proximity group 220. For example, the proximity group 220 can be generated by grouping the POI record 202 having the address information within a proximity boundary 222 determined by the navigation system 100. For specific example, the proximity boundary 222 can represent the Wall Street area of NYC. The navigation system 100 can generate the proximity group 220 that includes the plurality of the POI record 202 having the record attribute 208 of the address information within the Wall Street area.

The navigation system 100 can change the proximity boundary 222 based on the population density 216 to increase or decrease the number of the POI record 202 to be reconciled for generating the exemplary POI 236. For example, the navigation system 100 can increase the proximity boundary 222 to not only include the Midtown area of NYC, but also the Upper East Side of NYC.

The navigation system 100 can consider a similarity level 224 to reconcile the plurality of the POI record 202 for generating the exemplary POI 236. For example, the instance of the POI record 202 of "Starbuck" and another instance of the POI record 202 of "Starbucks" can have a high level of the similarity level 224 because the two instances of the POI record 202 is only different by a letter "s" in spelling the word. In contrast, the similarity level 224 between Starbucks Coffee™ and Walmart™ can have a low level for the similarity level 224 when the spelling of the name information of the POI record 202 not only have different spellings but also have the POI type 218 that is different.

The navigation system 100 can track the similarity level 224 by determining a similarity score 226. For example, the similarity score 226 can be represented as QGram score, Soft term frequency-inverse document frequency (TFIDF) score, or a combination thereof. For specific example, QGram score can be determined based on counting a number of "q" letters long shared by comparing two words. For another example, Soft TFIDF score can represent a numerical statistic which reflects how important a word is to a document based on how many times it appears in the document.

The navigation system 100 can determine the similarity score 226 to be high if the similarity score 226 can meet or exceed a similarity threshold 228, which is defined as a minimum level of the similarity score 226 to determine that the plurality of the POI record 202 compared are similar. For specific example, the similarity threshold 228 can be 0.1. If the similarity score 226 is below 0.1, the navigation system 100 can determine the similarity level 224 to be low.

The navigation system 100 can generate a record segment 230 to determine the similarity level 224. The record segment 230 is defined as the POI record 202 that has been parsed. For example, the instance of the POI record 202 can represent "Starbucks at Wall St." The navigation system 100 can parse the POI record 202 to generate a plurality of the record segment 230 of "Starbucks," "on," "Wall," and "St."

The record segment 230 can be represented as each of the record attribute 208 for the POI record 202. For example, the instance of the POI record 202 of "Starbucks at Wall St." can include the two instances of the record attribute 208. More specifically, the record attribute 208 of the name information can be "Starbucks" and the record attribute 208 of the address information can be "Wall St."

The navigation system 100 can generate a record cluster 232 to group the plurality of the POI record 202. The record cluster 232 can represent a grouping of the POI record 202 based on the similarity level 224. For example, the two instances of the POI record 202 representing "Starbuck" and "Starbucks" can have the high level of the similarity level 224.

The navigation system 100 can include the instances of the POI record 202 representing "Starbuck" and "Starbucks" within a same instance of the record cluster 232. In contrast, the navigation system 100 can include the instances of the POI record 202 representing "Starbucks Coffee™" and "Walmart™" in a separate instance of the record cluster 232 because of the low level of the similarity level 224 between "Starbucks Coffee™" and "Walmart™."

The navigation system 100 can generate a travel route 234. The travel route 234 can represent a path to reach the POI 206 represented by the exemplary POI 236. For example, the user of the first device 102 can traverse the travel route 234 to reach the POI 206, such as Starbucks Coffee™.

Figure 3:
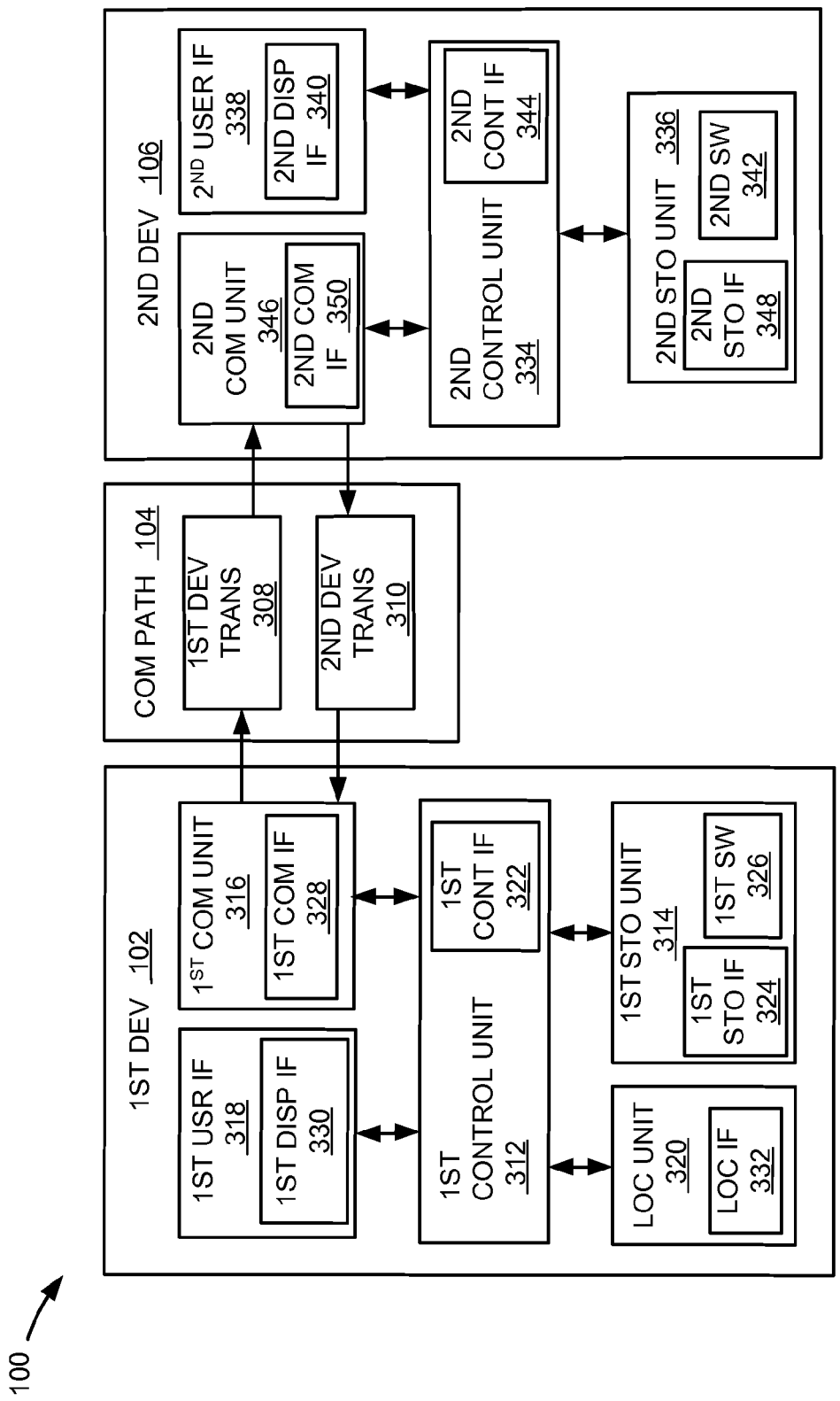
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first control unit 312 can include a first control interface 322. The first control unit 312 can execute a first software 326 to provide the intelligence of the navigation system 100. The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations physically separate from the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations physically separate from the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, points of interest (POI), navigation routing entries, or any combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations physically separate from the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations physically separate from the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations physically separate from the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 320, although it is understood that the second device 106 can also operate the location unit 320.

Figure 4:
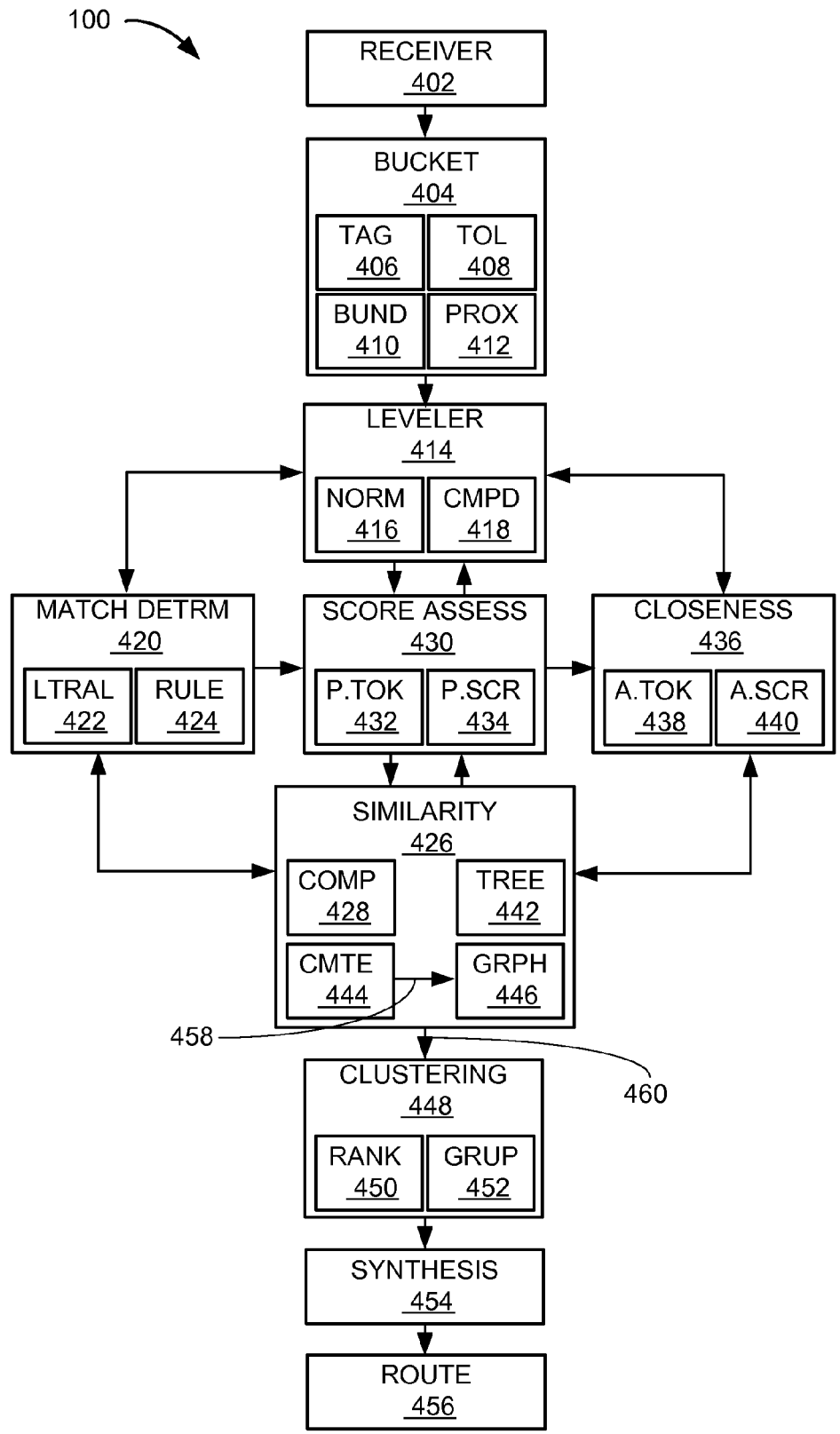
FIG. 4 is a control flow of the navigation system.

Referring now to FIG. 4, therein is shown a control flow of the navigation system 100. The navigation system 100 can include a receiver module 402. The receiver module 402 receives the POI record 202 of FIG. 2. For example, the POI record 202 from the record source 204 of FIG. 2 can be transmitted through the communication path 104 of FIG. 1 to the first device 102 of FIG. 1 or the second device 106 of FIG. 1.

The navigation system 100 can include a bucket module 404, which can be coupled to the receiver module 402. The bucket module 404 can receive the POI record 202 from the receiver module 402. The bucket module 404 groups the plurality of the POI record 202. For example, the bucket module 404 can generate the proximity group 220 of FIG. 2 based on the geographic region 212 of FIG. 2 for the POI record 202 for grouping the plurality of the POI record 202.

The bucket module 404 can include a tagging module 406. The tagging module 406 determines the brand code 210 for adding the brand code 210 into the POI record 202. For example, as discussed in FIG. 2 above, an industry standard can designate a specific numeric code to signify a brand name. For further example, Walmart™ can have the brand code 210 of "200" and Starbucks Coffee™ can have the brand code 210 of "100." The tagging module 406 can include a repository with a plurality of the brand code 210 for each of the brand names.

The tagging module 406 can receive the POI record 202 from the receiver module 402. The POI record 202 can include a string expression of "Starbuck Coffee." The tagging module 406 can include the repository with a list of names of brand names. The tagging module 406 can include the repository with a list of industry type according to the SIC. For example, the industry type of SIC can include "Retail Eating & Drinking Place." And SIC can include "coffee" under the industry type of "Retail Eating & Drinking Place."

The tagging module 406 can perform a string matching algorithm to determine that the string expression of "Starbuck Coffee" includes the string expression that can belong in the industry type of SIC. More specifically, the tagging module 406 can identify the string expression "coffee" in "Starbuck Coffee" by performing a letter to letter comparison of string matching algorithm. As a result, the tagging module 406 can determine that the brand code 210 of "100" can be assigned for "Starbuck Coffee" and, subsequently, can add the brand code 210 of "100" to the POI record 202.

The bucket module 404 can include a tolerance module 408. The tolerance module 408 determines the distance tolerance level 214 of FIG. 2 for determining whether the plurality of the POI information is duplicates. For example, the tolerance module 408 can determine the distance tolerance level 214 for distinguishing the POI 206 of FIG. 2 within the geographic region 212.

The tolerance module 408 can determine the distance tolerance level 214 in a number of ways. As discussed in FIG. 2, the tolerance module 408 can determine the distance tolerance level 214 based on the population density 216 of FIG. 2, the POI type 218 of FIG. 2, or a combination thereof. More specifically, the tolerance module 408 can determine the distance tolerance level 214 to be high if the population density 216 is low. Further, if the availability of the POI type 218 within the geographic region 212 is sparse, the physical distance apart that is small can deem the POI information to be duplicate information to signify the same of the POI 206 rather than the POI 206 that is different.

In contrast, the tolerance module 408 can determine the distance tolerance level 214 to be low if the population density 216 is high. Further, if the availability of the POI type 218 within the geographic region 212 is high, the physical distance apart that is small can deem the POI 206 to be not duplicates. For specific example, the tolerance module 408 can determine the POI 206 representing Starbucks Coffee™ in the geographic region 212 of NYC to have the distance tolerance level 214 of low. The availability of Starbucks Coffee™ and the population density 216 within NYC is high. As a result, the plurality of the POI 206 that may only be separated a block away from each other can be considered to be non-duplicates of the POI 206.

It has been discovered that the present invention can determine the distance tolerance level 214 to improve the accuracy of comparing the plurality of the POI record 202. By determining the distance tolerance level 214, the navigation system 100 can identify whether the plurality of the POI 206 is a duplicate. As a result, by identifying the duplicate, the navigation system 100 can eliminate redundancy of the POI information for the POI 206, and improve the accuracy of determining the similarity level 224 from comparing the plurality of the POI record 202.

The bucket module 404 can include a boundary module 410. The boundary module 410 generates the proximity boundary 222 FIG. 2 to control the number of instances of the POI record 202 collected within the geographic region 212. For example, the boundary module 410 can generate the proximity boundary 222 for grouping the POI record 202. More specifically, the boundary module 410 can change the proximity boundary 222 based on the population density 216 for capturing the POI record 202 within the proximity boundary 222.

The boundary module 410 can generate the proximity boundary 222 in a number of ways. For example, the boundary module 410 can increase the size of the proximity boundary 222 for the geographic region 212 where the population density 216 is low. For specific example, the boundary module 410 can generate the proximity boundary 222 to be 50 square kilometers for Omaha to capture more of the POI record 202. The size of the proximity boundary 222 can be inversely proportional to the population density 216. More specifically, the rate of increase or decrease of the size can base on how much greater or less than the global average for the population density 216. For example, the boundary module 410 can increase the size of the proximity boundary 222 up to the point where the number of the POI record 202 that can be collected is equivalent to if the population density 216 is greater than 100 times the global average.

In contrast, the boundary module 410 can decrease the size of the proximity boundary 222 for the geographic region 212 where the population density 216 is high. For specific example, the POI 206 with the same instance of the POI type 218 can exist within a 100 square meters. The boundary module 410 can generate the proximity boundary 222 of 50 square meters to capture less of the POI record 202. For different example, the boundary module 410 can generate the proximity boundary 222 to represent the boundaries of a neighborhood, a city, a county, a territory, or a combination thereof. More specifically, the boundary module 410 can generate the proximity boundary 222 to represent the Upper Westside of NYC.

The bucket module 404 can include a proximity module 412. The proximity module 412 generates the proximity group 220 of FIG. 2 to collect a sample size of the POI record 202 within the geographic region 212. For example, the proximity module 412 can generate the proximity group 220 based on the geographic region 212 for the POI record 202 for grouping the plurality of the POI record 202.

The proximity module 412 can generate the proximity group 220 in a number of ways. For example, the proximity module 412 can generate the proximity group 220 based on the proximity boundary 222. More specifically, the proximity boundary 222 can represent Wall Street area in NYC. The proximity module 412 can generate the proximity group 220 based on including the POI record 202 having the address information of Wall Street in NYC for the proximity group 220.

For different example, the proximity module 412 can change the number of the POI record 202 collected for the proximity group 220 based on the population density 216. More specifically, the higher the population density 216, the proximity module 412 can increase the number of the POI record 202 collected to increase the sample size for the proximity group 220 by changing the size of the proximity boundary 222. Even where the population density 216 is low, the size of the proximity boundary 222 can be increased to increase the sample size of the POI record 202 for the proximity group 220.

It has been discovered that the proximity group 220 based on the population density 216 improves the accuracy of comparing the plurality of the POI record 202. By accommodating the population density 216, the navigation system 100 can generate the proximity group 220 more reflective of the geographic region 212 to improve the accuracy of determining the similarity level 224 from comparing the plurality of the POI record 202.

The navigation system 100 can include a leveler module 414, which can be coupled to the bucket module 404. The leveler module 414 can receive the proximity group 220 from the bucket module 404. The leveler module 414 normalizes the raw dataset of the POI information. For example, the leveler module 414 can normalize the POI record 202 for converting the string expression of the name information of the POI 206 into all lower case.

The leveler module 414 can normalize the POI record 202 in a number of ways. The leveler module 414 can include a normalization module 416. The normalization module 416 can normalize the POI record 202 based on an alphabet case, a punctuation, a synonym acronym, or a combination thereof. For example, the POI record 202 can include the plurality of the record attribute 208 expressed as string object. The record attribute 208 for the name information can be represented as "WalMart." The normalization module 416 can convert "WalMart" into "walmart," all lower case, with the alphabet case normalization.

For different example, the normalization module 416 can parse the string object of the record attribute 208 to check if the string contains a special character. The special character can represent a character designated to be replaced with another character. For example, "#" can represent a special character. If the record attribute 208 includes "#" as part of the string, the normalization module 416 can replace "#" with a space character with the punctuation normalization.

For another example, the normalization module 416 can tokenize the string object of the record attribute 208 to generate a token using a tokenization algorithm. The token is defined as series of characters having two space characters at the beginning and end of the characters. For example, the normalization module 416 can include a list of acronyms and synonyms stored in the repository. The normalization module 416 can tokenize the record attribute 208 by separating the string objects separated by the space character. If the instance of the record attribute 208 can represent "Wall Street," the normalization module 416 can tokenize the string object in to "Wall" and "Street." The normalization module 416 can compare the token to replace the token with the acronym. For specific example, the normalization module 416 can replace the token representing "Street" with the acronym of "St."

The leveler module 414 can include a compound module 418. The compound module 418 recombines the string object of the record attribute 208 that was normalized. For example, the compound module 418 can recombine the tokenized string object with the special character removed from the POI record 202. For specific example, the original of the record attribute 208 can represent "Starbucks#Coffee." The normalized and tokenized version of the string object can represent "Starbucks" and "Coffee." The compound module 418 can recombine the tokenized string objects to generate "Starbucks Coffee."

The navigation system 100 can include a match determinator module 420, which can be coupled to the leveler module 414. The match determinator module 420 can receive the POI record 202 from the leveler module 414. The match determinator module 420 determines whether there is an exact match between the plurality of the POI record 202. More specifically, the match determinator module 420 can determine whether there is an exact match for the record attribute 208 in the POI record 202. For example, the match determinator module 420 can select the record attribute 208 of the POI record 202 for comparing the plurality of the record attribute 208. For further example, the match determinator module 420 can compare the plurality of the record attribute 208 representing the name information of the POI 206 and the address information of the POI 206.

For example, the exact match can represent the two instances of the POI record 202 having all of the record attribute 208 to be exactly the same between the two instances of the POI record 202. For different example, the exact match can represent the spelling of the name information for the two instances of the record attribute 208 having the same spelling.

The match determinator module 420 can determine the exact match in a number of ways. The match determinator module 420 can include a literal module 422. The literal module 422 can compare the record attribute 208 of one instance of the POI record 202 to the another instance of the record attribute 208 of the another instance of the POI record 202. For example, the literal module 422 can compare the record attribute 208 representing the name information of the POI 206. For specific example, the one instance of the POI record 202 can include the name information "Walmart Supercenter" as the record attribute 208. The other instance of the POI record 202 can include the name information "Walmart Supercenter" as the record attribute 208. The literal module 422 can determine the two names are an exact match by comparing the two string expressions of "Walmart Supercenter." Once the exact match is determined, the literal module 422 can stop further comparison of the POI record 202.

For different example, the literal module 422 can match the record attribute 208 of the brand code 210 instead of the name information of the POI 206. The name information of the first instance of the POI 206 can be "The Walmart Supercenter." The name information of the second instance of the POI 206 can be "Wal Mart Super Center The." However, both of the POI record 202 can have the brand code 210 of "200" as the record attribute 208. Based on the brand code 210, the literal module 422 can determine the name information for both of the POI record 202 to be equivalent or the exact match. Once the exact match is determined, the literal module 422 can stop further comparison of the POI record 202.

For another example, the literal module 422 can compare the record attribute 208 that had been normalized, tokenized, and recombined to determine whether there is an exact match. For example, the original name information for the one instance of the POI record 202 can be "wal mart # the." The original name information for the another instance of the POI record 202 can be "walmart #$ the." "#" and "$" can represent the special characters that can be removed. The normalized and compounded string object for both of the record attribute 208 can be "walmartthe." The literal module 422 can determine that the one instance of the POI record 202 and the another instance of the POI record 202 to be a match based on the normalized and compounded string object. Once the exact match is determined, the literal module 422 can stop further comparison of the POI record 202.

For different example, the literal module 422 can compare the record attribute 208 representing the address information to determine whether there is an exact match. For specific example, the address information for the one instance of the POI record 202 can be "1130 Kifer Road, Suite #12." The address information for the another instance of the POI record 202 can be "1130 kifer road suite 12". The address information for the one instance of the POI record 202 can be normalized, tokenized, and compounded to "1130kiferroadsuite12." The address information for the another instance of the POI record 202 can be normalized, tokenized, and compounded to "1130kiferroadsuite12." The literal module 422 can determine that the one instance of the POI record 202 and the another instance of the POI record 202 to be a match based on the normalized and compounded string object. Once the exact match is determined, the literal module 422 can stop further comparison of the POI record 202.

The match determinator module 420 can include a rule module 424. For example, the rule module 424 can modify the record attribute 208 when the exact match was not found after comparing the plurality of the record attribute 208. For specific example, the rule module 424 can tokenize the string object representation of the record attribute 208 for comparing the plurality of the record attribute 208. More specifically, the rule module 424 can tokenize the string object based on space character of the one instance of the record attribute 208 being compared.

For specific example, the one instance of the record attribute 208 for the one instance of the POI record 202 can represent the name information of "wal mart super center." The another instance of the record attribute 208 for the another instance of the POI record 202 can represent "Walmart Supercenter." The rule module 424 can tokenize the another instance of the record attribute 208 based on the space character locations of the one instance of the record attribute 208. For example, the another instance of the record attribute 208 can be normalized and tokenized to "wal mart super center." The rule module 424 can determine the exact match based on comparing the one instance of the POI record 202 to the another instance of the POI record 202 that had been tokenized. Once the exact match is determined, the rule module 424 can stop further comparison of the POI record 202.

For different example, the rule module 424 can replace a numeric number with a string expression of an ordinal number. The numeric number can represent the number "150" and the string expression of the ordinal number for the numeric number can represent "one hundred fifty." For specific example, the one instance of the POI record 202 can include the record attribute 208 of the name information of the POI 206 as "Peoria Public school District one hundred fifty." The another instance of the POI record 202 can include the record attribute 208 of the name information of the POI 206 as "Peoria Public school District 150." Each of the record attribute 208 can be tokenized as discussed above. The rule module 424 can convert the numeric token of "150" into "one hundred fifty" for the another instance of the POI record 202. As a result, the rule module 424 can compare "Peoria Public school District one hundred fifty" for the one instance of the POI record 202 and the another instance of the POI record 202. The rule module 424 can determine the exact match based on comparing the one instance of the POI record 202 to the another instance of the POI record 202 that had the numeric token converted. Once the exact match is determined, the rule module 424 can stop further comparison of the POI record 202.

For different example, the rule module 424 can eliminate the unnecessary string expression from the record attribute 208. For example, the record attribute 208 can represent the name information of the POI 206 as "Jewish Community Center of Staten Island." The rule module 424 can set that the string object after "of" is unnecessary string expression for the name information for the POI 206. Subsequently, the rule module 424 can eliminate the characters after "of" to modify the name information of the POI 206 as "Jewish Community Center." The rule module 424 can compare the modified name information of the POI record 202 to the another instance of the POI record 202. The rule module 424 can determine the exact match based on comparing the one instance of the POI record 202 with the unnecessary string expression removed to the another instance of the POI record 202. Once the exact match is determined, the rule module 424 can stop further comparison of the POI record 202.

For another example, the rule module 424 can compare first instance of the record attribute 208 before the second instance of the record attribute 208 of the same instance of the POI record 202. More specifically, the rule module 424 can compare the second instance of the record attribute 208 only if the comparison of the first instance of the record attribute 208 resulted in the similarity score 226 of FIG. 2 meeting or exceeding the similarity threshold 228 of FIG. 2. For example, the rule module 424 can compare the record attribute 208 representing the address information before comparing the record attribute 208 representing the name information of the POI record 202.

For specific example, the POI record 202 can include the plurality of the record attribute 208, such as the name information of the POI 206 and the address information of the POI 206. The one instance of the POI record 202 can include the record attribute 208 of the name information of the POI 206 as "Walmart at story road" and the address information of the POI 206 as "777 story road." The another instance of the POI record 202 can include the record attribute 208 of the name information of the POI 206 as "Walmart" and the address information of the POI 206 as "777 Story road."

The rule module 424 can calculate the similarity score 226 of FIG. 2 by comparing the address information between the one instance of the POI record 202 to the another instance of the POI record 202. More specifically, the similarity score 226 can be calculated based on a number of edits required by the navigation system 100 to generate the same string object between both instances of the POI record 202.

If the similarity score 226 for the address information of the POI 206 exceeded the similarity threshold 228 of FIG. 2, the name information of the POI 206 can be compared. Subsequently, the rule module 424 can determine whether the name information of the POI 206 for the one instance of the POI record 202 exactly matches the name information of the POI 206 for the another instance of the POI record 202. Once the exact match is determined, the rule module 424 can stop further comparison of the POI record 202. Details regarding the determination of the similarity score 226 meeting or exceeding the similarity threshold 228 will be discussed later.

The navigation system 100 can include a similarity module 426, which can be coupled to the match determinator module 420. The similarity module 426 can receive the similarity score 226 from the match determinator module 420. The similarity module 426 determines the similarity level 224 of FIG. 2.

For example, the comparator module 428 can compare the similarity score 226 to the similarity threshold 228 to determine the similarity level 224. If the similarity score 226 exceeded the similarity threshold 228, the comparator module 428 can set the similarity level 224 to be a high similarity. If the similarity score 226 is below the similarity threshold 228, the comparator module 428 can set the similarity level 224 to be a no match. For specific example, if the similarity score 226 meet or exceeds the similarity threshold 228 of 0.85, the comparator module 428 can determine the two instances of the POI record 202 compared to be similar.

The navigation system 100 can include a score assessment module 430, which can be coupled to the match determinator module 420. The score assessment module 430 can receive the POI record 202 from the match determinator module 420. The score assessment module 430 can compare the plurality of the POI record 202 if the match determinator module 420 failed to determine the exact match between the plurality of the POI record 202. For example, the score assessment module 430 can select the record attribute 208 of the POI record 202 for comparing the plurality of the record attribute 208. For further example, the score assessment module 430 can calculate the similarity score 226 for comparing the plurality of the record attribute 208 representing the name information and the address information of the POI 206.

The score assessment module 430 can compare the plurality of the POI record 202 in a number of ways. The score assessment module 430 can include a preliminary tokenizer module 432. The preliminary tokenizer module 432 can tokenize the record attribute 208 for comparing the plurality of the record attribute 208. For example, the preliminary tokenizer module 432 can generate the record segment 230 of FIG. 2 based on segmenting the record attribute 208 for comparing the plurality of the POI record 202.

The preliminary tokenizer module 432 can generate the record segment 230 in a number of ways. For example, the preliminary tokenizer module 432, with the tokenization algorithm, can generate the record segment 230 by tokenizing the record attribute 208 into three of the record segment 230, the record segment 230 having three characters for the first two instances of the record segment 230. The third of the record segment 230 can have more than three characters. For specific example, the tokenization algorithm can include the QGram tokenizer. For different example, the preliminary tokenizer module 432 can generate the record segment 230 by tokenizing the record attribute 208 based on the SimpleTokenizer of SecondString open source library.

The score assessment module 430 can include a preliminary score module 434. The preliminary score module 434 can generate the similarity score 226 for comparing the plurality of the record segment 230. For example, the preliminary score module 434 can generate the similarity score 226 based on comparing the plurality of the record segment 230 utilizing the string matching algorithm.

For specific example, the similarity score 226, such as the QGram score, can be generated based on comparing the plurality of the record segment 230 utilizing the QGram string matching algorithm. For different example, the similarity score 226, such as the SoftTFIDF score, can be generated based on comparing the plurality of the record segment 230 utilizing the SoftTFIDF string matching algorithm. The SoftTFIDF score can be normalized by taking the average score between the comparison of the one instance of the POI record 202 and the another instance of the POI record 202.

For illustrative purposes, the navigation system 100 is shown with the comparator module 428 determining the similarity level 224 based on exact matching for identifying the plurality of the POI record 202 as similar, although it is understood that the comparator module 428 can be operated differently. For example, the comparator module 428 can determine the similarity level 224 based on the similarity score 226 meeting or exceeding the similarity threshold 228. For specific example, the similarity level 224 can be determined without determining the exact match between the plurality of the POI record 202.

For further example, the comparator module 428 can set the similarity threshold 228. For example, the comparator module 428 can set the similarity threshold 228 based on the average score for the plurality of the similarity score 226.

The comparator module 428 can receive the similarity score 226 from the score assessment module 430. If the similarity score 226 met the similarity threshold 228, the comparator module 428 can set the similarity level 224 to be an average similarity. If the similarity score 226 exceeded the similarity threshold 228, the comparator module 428 can set the similarity level 224 to be a high similarity. If the similarity score 226 is below the similarity threshold 228, the comparator module 428 can set the similarity level 224 to be a no match and stop further comparison. For specific example, if the QGram score or the SoftTFIDF score is less than the similarity threshold 228 of 0.1, the comparator module 428 can determine the two instances of the POI record 202 compared as a non-match.

For further example, the comparator module 428 can change the similarity threshold 228 based on various factors that can include the record attribute 208, the POI record 202, the POI type 218, or a combination thereof. For example, the comparator module 428 can increase the similarity threshold 228 for the record attribute 208 representing the address information of the POI 206. The comparator module 428 can set the similarity threshold 228 high for comparing the address information. More specifically, the higher the similarity threshold 228 for the similarity score 226 to meet, the lower the risk of having multiple variations of the address information for the POI 206. For different example, the comparator module 428 can set the similarity threshold 228 low for the similarity score 226 to meet for accommodating multiple variations for the name information of the POI 206. The comparator module 428 can set various levels of the similarity threshold 228 for each of the record attribute 208 for the POI record 202.

The navigation system 100 can include a closeness module 436, which can be coupled to the score assessment module 430. The closeness module 436 can receive the POI record 202 from the score assessment module 430. For example, the closeness module 436 can further compare the plurality of the POI record 202 after the score assessment module 430 had compared the plurality of the POI record 202. For specific example, the closeness module 436 can select the record attribute 208 of the POI record 202 for comparing the plurality of the record attribute 208. For further example, the closeness module 436 can calculate the similarity score 226 for comparing the record attribute 208 representing the distance tolerance level 214 of FIG. 2.

The closeness module 436 can compare the plurality of the POI record 202 in a number of ways. The closeness module 436 can include an additional tokenizer module 438. The additional tokenizer module 438 can tokenize the record attribute 208 representing the address information for comparing the plurality of the record attribute 208. For example, the additional tokenizer module 438 can generate the record segment 230 based on segmenting the address information for comparing the plurality of the POI record 202.

The additional tokenizer module 438 can generate the record segment 230 in a number of ways. Similarly to the preliminary tokenizer module 432, the additional tokenizer module 438 can generate the record segment 230 with the tokenizer algorithm. For example, the additional tokenizer module 438 can generate the record segment 230 by tokenizing the address information.

More specifically, the additional tokenizer module 438 can tokenize the address information into each tokens representing a different component of the address information. For specific example, the address information of "777 Story Road, San Jose, California 95122" can be tokenized into the following components: "777" for the street number information, "Story Road" for the street name information, "San Jose" for the city information, "California" for the state information, and "95122" for the zip code information.

The closeness module 436 can include an additional score module 440. The additional score module 440 can generate the similarity score 226 for comparing the plurality of the record segment 230. For example, the additional score module 440 can generate the similarity score 226 based on utilizing the same string matching algorithm for different component of the address information.

For specific example, the similarity score 226, such as the QGram score, can be generated based on comparing the plurality of the street name utilizing the QGram string matching algorithm. For different example, the similarity score 226, such as the QGram score, can be generated based on comparing the plurality of the street number utilizing the QGram string matching algorithm.

For another example, the additional score module 440 can generate the similarity score 226 based on utilizing the different string matching algorithm for the same component of the address information. For example, the string matching algorithm can include Jaro Winkler string matching algorithm. For specific example, the similarity score 226, such as the SoftTFIDF score, can be generated based on comparing the plurality of the street name utilizing the SoftTFIDF string matching algorithm in addition to the similarity score 226 of QGram Score.

For further example, the additional score module 440 can generate the similarity score 226 for comparing the plurality of the name information of the POI 206, the phone number information of the POI 206, or a combination thereof. For another example, the additional score module 440 can generate the similarity score 226 based on comparing the street direction information where the POI 206 is located, the street type information where the POI 206 is located, the POI type 218, the brand code 210 for the POI 206, the distance tolerance level 214 of the POI 206, or a combination thereof.

For illustrative purposes, the navigation system 100 is shown with the similarity module 426 determining the similarity level 224 based on the similarity score 226 meeting or exceeding the similarity threshold 228, although it is understood that the similarity module 426 can be operated differently. For example, the similarity module 426 can generate a decision tree to determine the similarity level 224 between the plurality of the POI record 202.

The similarity module 426 can include a tree module 442. For example, the tree module 442 can generate the decision tree based on the similarity score 226 generated by the additional score module 440. For further example, the tree module 442 can utilize the machine learning algorithm for generating the decision tree. For specific example, the tree module 442 can utilize the J48 by WEKA for the machine learning algorithm. For another example, the tree module 442 can utilize a support vector machine (SVM) for determining the similarity level 224 for the plurality of the POI record 202.

The tree module 442 can generate the decision tree based on a number of a machine learning classifier. The machine learning classifier can represent a decision point of the decision tree to determine which path of the decision tree to proceed. Each path of the decision tree can lead to a leaf node for determining whether the comparison of the plurality of the record attribute 208 is a match or a non-match.

For example, the decision tree can split into a plurality of the path based on whether the similarity score 226 met or exceeded the similarity threshold 228. The leaf node can represent a match between the plurality of the record attribute 208 if the similarity score 226 met or exceeded the similarity threshold 228. In contrast, the leaf node can represent the non-match between the plurality of the record attribute 208 if the similarity score 226 is below the similarity threshold 228.

The similarity module 426 can include a committee module 444. The committee module 444 can generate a committee judgment 458 to determine whether the plurality of the POI record 202 compared are a match or not. More specifically, the committee module 444 can generate the committee judgment 458 based on the number of leaf nodes represented as a match for the record attribute 208 of the POI record 202. For example, the committee module 444 can generate the committee judgment 458 based a decision strategy, such as "all match," "majority match," or "at least one match."

For specific example, the committee judgment 458 of "match" can be determined if all of the leaf node after comparing the plurality of the record attribute 208 resulted as match or with the similarity score 226 meeting or exceeding the similarity threshold 228. For different example, the committee judgment 458 of "match" can be determined if majority of the leaf node is represented as a match. For another example, the committee judgment 458 of "match" can be determined if the one instance of the leaf node is represented as a match.

For specific example, the committee module 444 can be set to utilize the decision strategy of "all match." The two instances of the POI record 202, the POI record 202 "A" and the POI record 202 "B," can be compared. Each of the two instances of the POI record 202 to be compared can include the two instances of the record attribute 208: the name information and the address information. The similarity score 226 after comparing the name information resulted in a match while the similarity score 226 after comparing the address information resulted in a non-match. Because the decision strategy of "all match" is utilized, the committee module 444 can determine that the POI record 202 "A" and the POI record 202 "B" to be a non-match. Further, even if the POI record 202 "C" and the POI record 202 "B" are found to be a match, since the similarity is not transitive, the POI record 202 "C" and the POI record 202 "A" does not necessarily determined to be a non-match.

The determination of the committee judgment 458 can be calibrated by selecting a combination of the decision strategy. For example, the committee module 444 can select the decision strategy of "all match" for comparing the record attribute 208 for the name information. For different example, the committee module 444 can select the decision strategy for "at least one match" for comparing the record attribute 208 for the POI type 218.

The similarity module 426 can include a graph module 446. The graph module 446 can generate a similarity graph 460. The similarity graph 460 can illustrate the similarity level 224 between the plurality of the POI record 202 relative to each other. More specifically, a distance between the two instances of the POI record 202 on the similarity graph 460 can be based on the similarity score 226 for comparing the two instances of the POI record 202. For specific example, if the similarity level 224 is high, the distance between the two instances of the POI record 202 on the similarity graph 460 can be close. For further example, the graph module 446 can generate the similarity graph 460 for each of the proximity group 220.

The navigation system 100 can include a clustering module 448, which can be coupled to the similarity module 426. The clustering module 448 can receive the similarity graph 460 from the similarity module 426. The clustering module 448 generates the record cluster 232 of FIG. 2. For example, the clustering module 448 can generate the record cluster 232 based on the similarity level 224 for grouping the plurality of the POI record 202. For another example, the clustering module 448 can generate a plurality of the record cluster 232 based on partitioning the similarity graph 460 for grouping the plurality of the POI record 202. More specifically, the plurality of the record cluster 232 can represent a graph clustering in the similarity graph 460.

The clustering module 448 can generate the record cluster 232 in a number of ways. The clustering module 448 can include a ranking module 450. The ranking module 450 can rank the record source 204 of the POI record 202 for prioritizing the record source 204.

The ranking module 450 can rank the record source 204 in a number of ways. For example, the ranking module 450 can rank the record source 204 representing POI record 202 provided by the vendor, such as Yelp™, higher than the record source 204 representing the user's entry by the user of the first device 102 because the vendor can provide more reliable and accurate POI information than the user.

For different example, the ranking module 450 can rank the record source 204 based on the age of the user. More specifically, the ranking module 450 can rank the record source 204, the POI record 202 transmitted by an 18 year old, higher than the record source 204, the POI record 202 transmitted by a 12 year old, because the 18 year old user may be able to provide more reliable and accurate POI information than the 12 year old user.

The clustering module 448 can include a group module 452. The group module 452 can generate the record cluster 232 based on the record source 204 ranked for grouping the plurality of the POI record 202. The group module 452 can generate the record cluster 232 utilizing a clustering algorithm. For example, the group module 452 can generate the record cluster 232 utilizing the clustering algorithm, such as the Markov Clustering. More specifically, the record cluster 232 can be generated based on grouping the plurality of the POI record 202 within the similarity graph 460.

For specific example, the record cluster 232 can be generated based on the record source 204 that is ranked the highest. The group module 452 can set the number of POI record 202 within the record cluster 232 to be five. The group module 452 can generate the record cluster 232 based on the POI record 202 submitted by the record source 204 with the highest rank and four others of the POI record 202. The four others of the POI record 202 can represent the closest in distance on the similarity graph 460 from the POI record 202 submitted by the record source 204 with the highest rank. For different example, the group module 452 can generate the record cluster 232 based on the plurality of the POI record 202 found to be an exact match.

The navigation system 100 can include a synthesis module 454, which can be coupled to the clustering module 448. The synthesis module 454 can receive the record cluster 232 from the clustering module 448. The synthesis module 454 generates the exemplary POI 236 of FIG. 2. For example, the synthesis module 454 can generate the exemplary POI 236 based on the record cluster 232 for displaying on the first device 102.

The synthesis module 454 can generate the exemplary POI 236 in a number of ways. For example, the synthesis module 454 can generate the exemplary POI 236 based on calculating a frequency of the POI record 202 in the record cluster 232. More specifically, the record attribute 208 representing the name information can have the token "Walmart" appear more frequently than the token "Walmart Super Store" in the record cluster 232. The synthesis module 454 can generate the exemplary POI 236 with the record attribute 208 for the name information of "Walmart" instead of "Walmart Super Store."

For different example, the synthesis module 454 can generate the exemplary POI 236 based on the record source 204 ranked. More specifically, the record attribute 208 for the exemplary POI 236 can be generated based on selecting from the POI record 202 submitted by the record source 204 with the highest rank.

The navigation system 100 can include a route module 456, which can be coupled to the synthesis module 454. The route module 456 can receive the exemplary POI 236 from the synthesis module 454. The route module 456 generates the travel route 234 of FIG. 2. For example, the route module 456 can generate the travel route 234 based on the exemplary POI 236 to reach the POI 206.

It has been discovered that the proximity boundary 222 for changing the number of the POI record 202 compared by the navigation system 100. The size of the proximity boundary 222 can be increased to increase the sample size of the POI record 202 compared. Further, the navigation system 100 can calculate the similarity score 226 from the increased sample size to determine the similarity level 224 amongst the plurality of the POI record 202. As a result, the navigation system 100 can generate the exemplary POI 236 that is more accurate and representative of the POI 206.

It has been discovered that similarity threshold 228 for calibrating the similarity level 224. The similarity threshold 228 can be increased to eliminate the POI record 202 that is considered duplicates. As a result, the navigation system 100 can generate the exemplary POI 236 that is more accurate and representative of the POI 206.

It has been discovered that the similarity threshold 228 based on the type of the record attribute 208. Having the flexibility to calibrate the similarity threshold 228 based on the record attribute 208 basis, the navigation system 100 can reduce multiple variations of the POI information for the record attribute 208. As a result, the navigation system 100 can generate the exemplary POI 236 that is more accurate and representative of the POI 206.

It has been discovered that the navigation system 100 can rank the record source 204 for prioritizing the record source 204. The ability to rank the record source 204 improves the reliability for comparing the plurality of the POI record 202.

As a result, the navigation system 100 can generate the exemplary POI 236 that is more accurate and representative of the POI 206.

The physical transformation from traveling from one of the geographic region 212 to another of the geographic region 212 results in movement in the physical world, such as people using the first device 102, the vehicle, or a combination thereof, based on the operation of the navigation system 100. As the movement in the physical world occurs, the movement itself creates additional information that is converted back into changes in the distance tolerance level 214 for the generation of the exemplary POI 236 for the continued operation of the navigation system 100 and to continue the movement in the physical world.

The first software 326 of FIG. 3 of the first device 102 of FIG. 3 can include the modules for the navigation system 100. For example, the first software 326 can include the receiver module 402, the bucket module 404, the leveler module 414, the match determinator module 420, the score assessment module 430, the closeness module 436, the similarity module 426, the clustering module 448, the synthesis module 454, and the route module 456.

The first control unit 312 of FIG. 3 can execute the first software 326 for the receiver module 402 to receive the POI record 202. The first control unit 312 can execute the first software 326 for the bucket module 404 to group the plurality of the POI record 202. The first control unit 312 can execute the first software 326 for the leveler module 414 to normalize the POI record 202. The first control unit 312 can execute the first software 326 for the match determinator module 420 to determine the exact match between the plurality of the POI record 202.

The first control unit 312 can execute the first software 326 for the score assessment module 430 to calculate the similarity score 226. The first control unit 312 can execute the first software 326 for the closeness module 436 to generate the record segment 230. The first control unit 312 can execute the first software 326 for the similarity module 426 to determine the similarity level 224. The first control unit 312 can execute the first software 326 for the clustering module 448 to generate the record cluster 232.

The first control unit 312 can execute the first software 326 for the synthesis module 454 to generate the exemplary POI 236. The first control unit 312 can execute the first software 326 for the synthesis module 454 to generate the exemplary POI 236.

The second software 342 of FIG. 3 of the second device 106 of FIG. 3 can include the modules for the navigation system 100. For example, the second software 342 can the receiver module 402, the bucket module 404, the leveler module 414, the match determinator module 420, the score assessment module 430, the closeness module 436, the similarity module 426, the clustering module 448, the synthesis module 454, and the route module 456.

The second control unit 334 of FIG. 3 can execute the second software 342 the receiver module 402 to receive the POI record 202. The second control unit 334 can execute the second software 342 for the bucket module 404 to group the plurality of the POI record 202. The second control unit 334 can execute the second software 342 for the leveler module 414 to normalize the POI record 202.

The second control unit 334 can execute the second software 342 for the match determinator module 420 to determine the exact match between the plurality of the POI record 202. The second control unit 334 can execute the second software 342 for the score assessment module 430 to calculate the similarity score 226.

The second control unit 334 can execute the second software 342 for the closeness module 436 to generate the record segment 230. The second control unit 334 can execute the second software 342 for the similarity module 426 to determine the similarity level 224. The second control unit 334 can execute the second software 342 for the clustering module 448 to generate the record cluster 232.

The second control unit 334 can execute the second software 342 for the synthesis module 454 to generate the exemplary POI 236. The second control unit 334 can execute the second software 342 for the synthesis module 454 to generate the exemplary POI 236.

The modules of the navigation system 100 can be partitioned between the first software 326 and the second software 342. For example, the second software 342 can include the bucket module 404, the leveler module 414, the match determinator module 420, the score assessment module 430, the closeness module 436, the similarity module 426, the clustering module 448, the synthesis module 454, and the route module 456. The second control unit 334 can execute modules partitioned on the second software 342 as previously described.

The first software 326 can include the receiver module 402. Based on the size of the first storage unit 314 of FIG. 3, the first software 326 can include additional modules of the navigation system 100. The first control unit 312 can execute the modules partitioned on the first software 326 as previously described.

The first control unit 312 can operate the first communication unit 316 of FIG. 3 to send the POI record 202 to the second device 106. The first control unit 312 can operate the first software 326 to operate the location unit 320 of FIG. 3. The second communication unit 336 of FIG. 3 can send the exemplary POI 236 to the first device 102 through the communication path 104 of FIG. 3.

The navigation system 100 describes the module functions or order as an example. The modules can be partitioned differently. For example, the similarity module 426 and the clustering module 448 can be combined. Each of the modules can operate individually and independently of the other modules.

It has been discovered that the navigation system 100 can generate the exemplary POI 236 based on the record cluster 232 to provide accurate POI information to the user for the safe operation of the first device 102. By generating the record cluster 232 based on the similarity level 224, the navigation system 100 can group the POI record 202 more accurately and efficiently to eliminate incomplete and inaccurate POI information. As a result, the navigation system 100 can provide the exemplary POI 236 that is most accurate representation of the POI 206 for improving the safety and operation of the navigation system 100 and the vehicle.

Furthermore, data generated in one module can be used by another module without being directly coupled to each other. For example, the similarity module 426 can receive the POI record 202 from the bucket module 404. The receiver module 402, the bucket module 404, the leveler module 414, the match determinator module 420, the score assessment module 430, the closeness module 436, the similarity module 426, the clustering module 448, the synthesis module 454, and the route module 456 can be implement in as hardware (not shown) within the first control unit 312, the second control unit 334, or special hardware (not shown) in the first device 102 or the second device 106.

Figure 5:
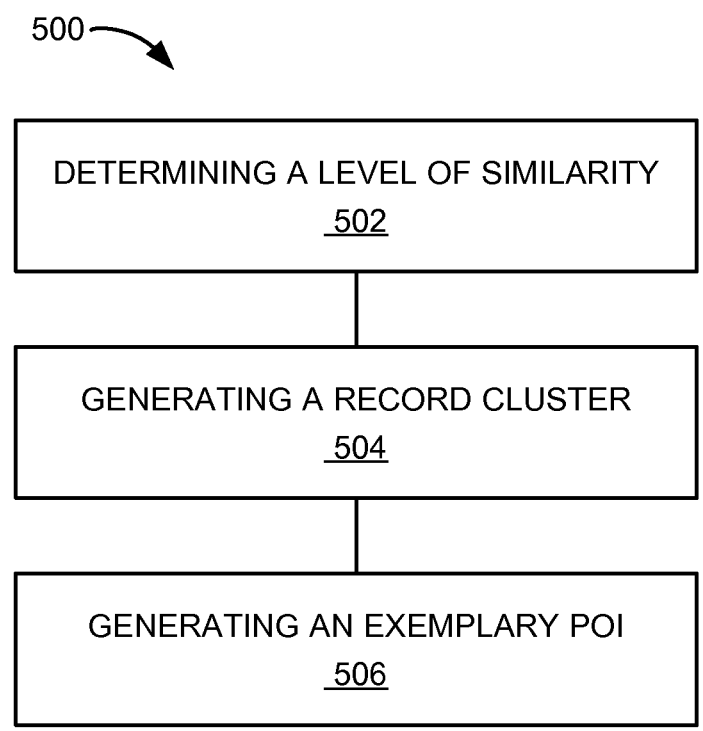
FIG. 5 is a flow chart of a method of operation of the navigation system of FIG. 1 in a further embodiment of the present invention.

Referring now to FIG. 5, therein is shown a flow chart of a method 500 of operation of the navigation system 100 of FIG. 1 in a further embodiment of the present invention. The method 500 includes: determining a similarity level based on comparing a plurality of a point of interest (POI) record in a block 502; generating a record cluster based on the similarity level for grouping the plurality of the POI record in a block 504; and generating an exemplary POI based on the record cluster for displaying on a device in a block 506.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   normalizing a point of interest (POI) record by modifying a string expression of the POI record based on a formatting of the string expression;
   determining a similarity level based on a number of leaf nodes in a decision tree representing a match between a plurality of the POI record, wherein the similarity level between the plurality of the POI record is not transitive;
   generating a record cluster based on the similarity level for grouping the plurality of the POI record;
   generating an exemplary POI, with a control unit, based on the record cluster; and
   generating a travel route based on the exemplary POI for displaying on a device.

2. The method as claimed in claim 1 further comprising calculating a similarity score based on comparing the POI records for determining the similarity level.

3. The method as claimed in claim 1 further comprising determining a distance tolerance level to eliminate a duplicate of the POI record within a geographic region for determining the similarity level.

4. The method as claimed in claim 1 further comprising selecting a record attribute of the POI record to be compared for determining the similarity level.

5. The method as claimed in claim 1 wherein generating the record cluster includes ranking a record source of the POI record for prioritizing the record source.

6. A method of operation of a navigation system comprising:
   normalizing a point of interest (POI) record by modifying a string expression of the POI record based on a formatting of the string expression
   determining a similarity level based on a number of leaf nodes in a decision tree representing a match between a plurality of the POI record, wherein the similarity level between the plurality of the POI record is not transitive;
   generating a record cluster based on the similarity level for grouping the plurality of the POI record;
   generating an exemplary POI, with a control unit, based on a frequency of the POI record in the record cluster for identifying a POI; and
   generating a travel route to the exemplary POI for displaying on a device.

7. The method as claimed in claim 6 further comprising generating a record segment based on segmenting a record attribute for comparing the plurality of the POI record.

8. The method as claimed in claim 6 further comprising changing a proximity boundary based on a population density for capturing the POI record to be compared for determining the similarity level.

9. The method as claimed in claim 6 wherein determining the similarity level includes determining a similarity score meeting or exceeding a similarity threshold for comparing the plurality of the POI record.

10. The method as claimed in claim 6 wherein determining the similarity level includes determining the similarity level based on comparing the plurality of a brand code for comparing the plurality of the POI record.

11. A navigation system comprising:
    a communication unit configured to receive a POI record;
    a control unit, coupled to the communication unit, configured to:
        normalize a point of interest (POI) record by modifying a string expression of the POI record based on a formatting of the string expression;
        determine a similarity level based on a number of leaf nodes in a decision tree representing a match between a plurality of the POI record, wherein the similarity level between the plurality of the POI record is not transitive;
        generate a record cluster based on the similarity level for grouping the plurality of the POI record;
        generate an exemplary POI based on the record cluster; and
        generate a travel route based on the exemplary POI for displaying on a device.

12. The system as claimed in claim 11 wherein the control unit is configured to calculate a similarity score based on comparing the POI records for determining the similarity level.

13. The system as claimed in claim 11 wherein the control unit is configured to determine a distance tolerance level to eliminate a duplicate of the POI record within a geographic region for determining the similarity level.

14. The system as claimed in claim 11 wherein the control unit is configured to select a record attribute of the POI record to be compared for determining the similarity level.

15. The system as claimed in claim 11 wherein the control unit is configured to rank the record source of a POI record for prioritizing the record source.

16. The system as claimed in claim 11 wherein the control unit is configured to generate the travel route representing a path to the exemplary POI for displaying on the device.

17. The system as claimed in claim 16 wherein the control unit is configured to generate a record segment based on segmenting a record attribute for comparing the plurality of the POI record.

18. The system as claimed in claim 16 wherein the control unit is configured to change a proximity radius based on a population density for capturing the POI record to be compared for determining the similarity level.

19. The system as claimed in claim 16 wherein the control unit is configured to determine a similarity score meeting or exceeding a similarity threshold for comparing the plurality of the POI record.

20. The system as claimed in claim 16 wherein the control unit is configured to determine the similarity level based on comparing the plurality of a brand code for comparing the plurality of the POI record.

* * * * *